(12) United States Patent
Okamura et al.

(10) Patent No.: US 11,192,827 B2
(45) Date of Patent: Dec. 7, 2021

(54) SINTERED MATERIAL AND CUTTING TOOL INCLUDING SAME

(71) Applicants: Sumitomo Electric Industries, Ltd., Osaka (JP); SUMITOMO ELECTRIC HARDMETAL CORP., Itami (JP)

(72) Inventors: Katsumi Okamura, Osaka (JP); Hisaya Hama, Osaka (JP); Mayu Amemiya, Osaka (JP); Satoru Kukino, Itami (JP)

(73) Assignees: Sumitomo Electric Industries, Ltd., Osaka (JP); SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/973,871

(22) PCT Filed: Mar. 4, 2019

(86) PCT No.: PCT/JP2019/008309
§ 371 (c)(1),
(2) Date: Dec. 10, 2020

(87) PCT Pub. No.: WO2019/244414
PCT Pub. Date: Dec. 26, 2019

(65) Prior Publication Data
US 2021/0171402 A1   Jun. 10, 2021

(30) Foreign Application Priority Data

Jun. 18, 2018 (JP) .............................. JP2018-115481

(51) Int. Cl.
| | | |
|---|---|---|
| *C04B 35/5831* | (2006.01) | |
| *C04B 35/106* | (2006.01) | |
| *C04B 35/482* | (2006.01) | |
| *C04B 35/58* | (2006.01) | |
| *B23B 27/14* | (2006.01) | |

(52) U.S. Cl.
CPC ........ *C04B 35/5831* (2013.01); *C04B 35/106* (2013.01); *C04B 35/482* (2013.01); *C04B 35/58028* (2013.01); *B23B 27/14* (2013.01)

(58) Field of Classification Search
CPC .......................... C04B 35/581; C04B 35/5831
See application file for complete search history.

(56) References Cited

U.S. PATENT DOCUMENTS

| | | | | |
|---|---|---|---|---|
| 8,993,132 | B2 * | 3/2015 | Okamura | C04B 35/6303 428/704 |
| 9,856,175 | B2 * | 1/2018 | Okamura | B23C 5/16 |
| 10,081,577 | B2 * | 9/2018 | Hirano | B23B 27/14 |

(Continued)

FOREIGN PATENT DOCUMENTS

| | | |
|---|---|---|
| EP | 371211 A2 | 6/1990 |
| JP | S63-129066 A | 6/1988 |

(Continued)

*Primary Examiner* — Karl E Group
(74) *Attorney, Agent, or Firm* — Faegre Drinker Biddle & Reath LLP (57) ABSTRACT

A sintered material includes a cubic boron nitride, a zirconium-containing oxide, a zirconium-containing nitride, and an aluminum-containing oxide, wherein the zirconium-containing nitride includes both or one of ZrN and ZrON, and the aluminum-containing oxide includes a type $Al_2O_3$.

4 Claims, 1 Drawing Sheet

(56) References Cited

U.S. PATENT DOCUMENTS

| | | |
|---|---|---|
| 2010/0313489 A1 | 12/2010 | Teramoto et al. |
| 2012/0208006 A1 | 8/2012 | Okamura et al. |
| 2012/0304544 A1 | 12/2012 | Yokoshi |
| 2013/0079215 A1 | 3/2013 | Okamura et al. |
| 2017/0197885 A1* | 7/2017 | Okamura ............ C04B 35/6303 |
| 2017/0362130 A1* | 12/2017 | Hirano ................ C04B 41/5063 |

FOREIGN PATENT DOCUMENTS

| | | |
|---|---|---|
| JP | 2014-520063 A | 8/2014 |
| WO | WO-2008/087940 A1 | 7/2008 |
| WO | WO-2011/059020 A1 | 5/2011 |
| WO | WO-2012/029440 A1 | 3/2012 |
| WO | WO-2012/057184 A1 | 5/2012 |
| WO | WO-2012/177467 A1 | 12/2012 |
| WO | WO-2016/104563 A1 | 6/2016 |
| WO | WO-2016/194398 A1 | 12/2016 |

* cited by examiner

SINTERED MATERIAL AND CUTTING TOOL INCLUDING SAME

TECHNICAL FIELD

The present disclosure relates to a sintered material and a cutting tool including the sintered material. The present application claims a priority based on Japanese Patent Application No. 2018-115481 filed on Jun. 18, 2018, the entire content of which is incorporated herein by reference.

BACKGROUND ART

Since cubic boron nitride (hereinafter, also referred to as "cBN") has a high hardness, a sintered material obtained by sintering the cubic boron nitride together with a binder such as $ZrO_2$ or $Al_2O_3$ has been conventionally used for tools such as a cutting tool (for example, WO 2008/087940 (Patent Literature 1), WO 2011/059020 (Patent Literature 2), WO 2012/029440 (Patent Literature 3), and WO 2012/057184 (Patent Literature 4)).

CITATION LIST

Patent Literature

PTL 1: WO 2008/087940
PTL 2: WO 2011/059020
PTL 3: WO 2012/029440
PTL 4: WO 2012/057184

SUMMARY OF INVENTION

A sintered material according to one embodiment of the present disclosure is a sintered material including a cubic boron nitride, an zirconium-containing oxide, a zirconium-containing nitride, and an aluminum-containing oxide, wherein the zirconium-containing nitride includes both or one of ZrN and ZrON, and the aluminum-containing oxide includes α type $Al_2O_3$.

A cutting tool according to one embodiment of the present disclosure includes the above-described sintered material.

DETAILED DESCRIPTION

Figure 1:
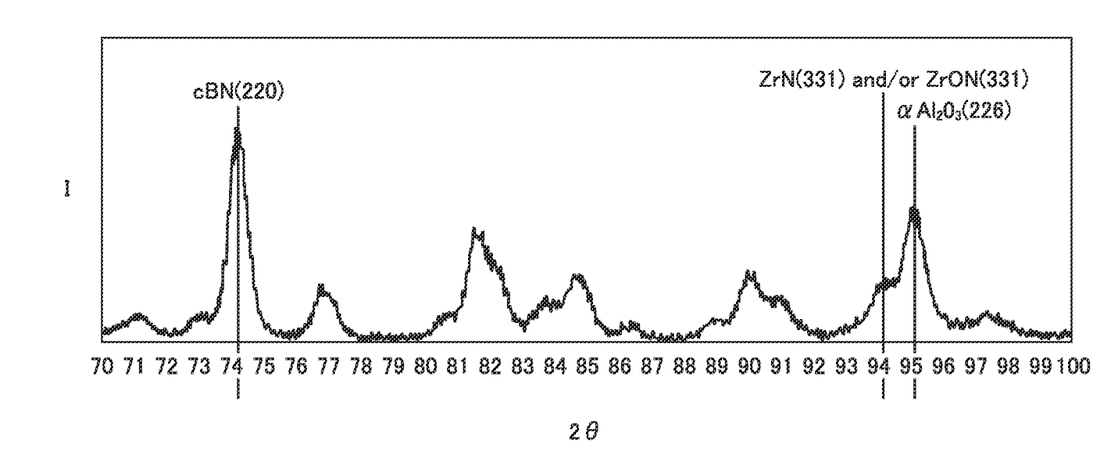
FIGURE is a graph showing an X-ray diffraction intensity profile of a sintered material of an Example 1 in a range of 2θ of 70° to 100° with the horizontal axis of the graph indicating 2θ and the vertical axis of the graph indicating a relative intensity (I) as a result of measuring an X-ray diffraction intensity of the sintered material of Example 1.

Problem to be Solved by the Present Disclosure

It has been known that a sintered material can be provided with high toughness when $ZrO_2$ is used as a binder. In view of this, attempts have been made to provide a sintered material with higher toughness by providing a high concentration of $ZrO_2$ therein. However, it has been clarified that when a sintered material contains a high concentration of $ZrO_2$, hardness thereof is decreased. Furthermore, recently, in the technical field of cutting tools, a cutting tool has been required to have excellent wear resistance and breakage resistance to achieve higher quality with regard to flexural strength and life. For each of the sintered materials disclosed in Patent Literature 1 to Patent Literature 4, excellent flexural strength and life are required in some cases.

The present disclosure has been made in view of the above-described situation, and has an object to provide a sintered material having excellent flexural strength and life as well as a cutting tool including the sintered material.

Advantageous Effect of the Present Disclosure

According to the description above, there can be provided a sintered material having excellent flexural strength and life as well as a cutting tool including the sintered material.

DESCRIPTION OF EMBODIMENTS

The present inventors have proceeded to develop a sintered material having excellent flexural strength and life. During the development, it has been found that when a difficult-to-cut cast iron is cut at a very high speed using a sintered material mainly composed of cBN, zirconia, and alumina, zirconia particles are not cracked but fall at a worn portion of the sintered material, thus resulting in progress of wear. On the other hand, it has been identified that a zirconium-containing nitride (ZrN, ZrON, or the like) exhibits an effective binding function between zirconia particles and cBN particles. This has been found to be effective in preventing the falling of zirconia particles.

However, it has been also identified that when a sintered material such as the one described above is obtained using a source material including a large amount of nitrogen, a reaction between cBN and zirconia is prevented during sintering, with the result that performance tends not to be improved with regard to flexural strength and life. In the manner described above, it has been found that a sintered material including a specific content of a zirconium-containing nitride has excellent flexural strength and life, thereby arriving at the present disclosure.

First, embodiments of the present disclosure are listed and described.

[1] A sintered material according to one embodiment of the present disclosure is a sintered material including a cubic boron nitride, an zirconium-containing oxide, a zirconium-containing nitride, and an aluminum-containing oxide, wherein the zirconium-containing nitride includes both or one of ZrN and ZrON, and the aluminum-containing oxide includes α type $Al_2O_3$. Such a sintered material can have excellent flexural strength and life.

[2] In a graph indicating 2θ in a horizontal axis and a relative intensity in a vertical axis as a result of measuring an X-ray diffraction intensity of the sintered material using an X-ray diffraction method, a peak of the relative intensity in a (331) plane of each of both of the ZrN and the ZrON or a peak of the relative intensity in a (331) plane of one of the ZrN and the ZrON preferably appears in a range of more than or equal to 93.5° and less than or equal to 94.5°. Accordingly, the sintered material can be more excellent with regard to flexural strength and life.

[3] In a graph indicating 2θ in a horizontal axis and a relative intensity in a vertical axis as a result of measuring an X-ray diffraction intensity of the sintered material using an X-ray diffraction method, the sintered material preferably satisfies a relational expression of $0.31 \leq I_{Zr}/I_{Al} \leq 0.62$, where $I_{Zr}$ represents a peak of the relative intensity in a (331) plane of each of both of the ZrN and the ZrON or a peak of the relative intensity in a (331) plane of one of the ZrN and the ZrON, and $I_{Al}$ represents a peak of the relative intensity in a (226) plane of the α type $Al_2O_3$. Such a sintered material can be also more excellent with regard to flexural strength and life.

[4] In a graph indicating 2θ in a horizontal axis and a relative intensity in a vertical axis as a result of measuring an X-ray diffraction intensity of the sintered material using an X-ray diffraction method, the sintered material preferably satisfies a relational expression of $0.12 \leq I_{Zr}/I_{BN} \leq 0.48$, where $I_{Zr}$ represents a peak of the relative intensity in a (331) plane of each of both of the ZrN and the ZrON or a peak of the relative intensity in a (331) plane of one of the ZrN and the ZrON, and $I_{BN}$ represents a peak of the relative intensity in a (220) plane of the cubic boron nitride. Such a sintered material can be also more excellent with regard to flexural strength and life.

[5] A cutting tool according to one embodiment of the present disclosure includes the above-described sintered material. Such a cutting tool can have excellent flexural strength and life.

Details of Embodiments of the Present Disclosure

Though an embodiment of the present disclosure (hereinafter also referred to as the "present embodiment") will be described hereinafter in detail, the present embodiment is not limited thereto. Explanation will be made below with reference to the FIGURE.

Here, in the present specification, the expression "A to B" represents a range of lower to upper limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. For example, when "AlCrN" is described, an atomic ratio in the AlCrN is not limited to Al:Cr:N=0.5:0.5:1, and includes all the conventionally known atomic ratios. The same also applies to compounds other than the "AlCrN".

<<Sintered Material>>

A sintered material of the present embodiment is a sintered material including a cubic boron nitride, a zirconium-containing oxide, a zirconium-containing nitride, and an aluminum-containing oxide. The zirconium-containing nitride includes both or one of ZrN and ZrON. The aluminum-containing oxide includes α type $Al_2O_3$. Such a sintered material can have excellent flexural strength and life.

The sintered material may include any other component(s) as long as the sintered material includes the cubic boron nitride, the zirconium-containing oxide, the zirconium-containing nitride, and the aluminum-containing oxide. Examples of the any other component(s) include, but not limited only to, other oxide(s), an auxiliary binder, and the like as described later. The sintered material may include an inevitable impurity as long as a desired effect is exhibited. The sintered material may include only the four components, i.e., the cubic boron nitride, the zirconium-containing oxide, the zirconium-containing nitride, and the aluminum-containing oxide. Hereinafter, each of the components that can be included in the sintered material will be described.

<Cubic Boron Nitride>

The sintered material of the present embodiment includes the cubic boron nitride. Preferably, the cubic boron nitride has an average particle size of 0.1 μm to 10 μm. In the case where the average particle size of the cubic boron nitride is less than 0.1 μm, aggregation is likely to occur when mixed with other source materials (zirconia, alumina, and the like), with the result that sintering tends to be insufficient. In the case where the average particle size of the cubic boron nitride is more than 10 μm, the strength of the sintered material tends to be decreased.

The particle sizes of the cubic boron nitride are preferably uniform in order to attain high strength with no stress concentration. Further, the particle sizes of the cubic boron nitride preferably exhibit a normal distribution. The particle sizes of the cubic boron nitride also preferably exhibit a binomial particle size distribution.

The content of the cubic boron nitride is preferably 20 to 80 volume % in the sintered material. When the content of the cubic boron nitride is less than 20 volume %, the hardness tends to be decreased to result in decreased wear resistance. When the content of the cubic boron nitride is more than 80 volume %, the respective amounts of the zirconium-containing oxide, the zirconium-containing nitride and the aluminum-containing oxide in the sintered material become very small, with the result that the wear resistance and breakage resistance tend to be decreased. A more preferable content of the cubic boron nitride is 30 to 60 volume %.

The average particle size and content (volume %) of the cubic boron nitride can be calculated using the following measuring method. Specifically, the sintered material is subjected to a CP (Cross Section Polisher) process using an argon ion beam, thereby obtaining a sample having a smooth cross section. The cross section of this sample is observed at a high magnification of 10000× using a scanning electron microscope (SEM; trademark: "JSM-7800F" provided by JEOL), thereby specifying cubic boron nitride particles in a visual field. Next, all the cubic boron nitride particles in the visual field are subjected to a binarization process using image analysis software (trademark: "WinRooF ver.6.5.3" provided by Mitani Corporation) so as to calculate equivalent circle diameters and total area thereof. The average value of the equivalent circle diameters is regarded as the average particle size, and the total area is regarded as the content.

In the present specification, by assuming that the total area of the cubic boron nitride calculated from the above-described cross section is continuous in the depth direction of the sintered material, the total area can be expressed as the content of the cubic boron nitride based on volume % as a unit. Each of the average particle size and content of the cubic boron nitride in the sintered material is preferably the average of values measured by performing the above-described image analysis onto prepared SEM images captured in three or more visual fields in the above-described cross section.

<Zirconium-Containing Oxide>

The sintered material of the present embodiment includes the zirconium-containing oxide. Specifically, the zirconium-containing oxide is preferably both or one of cubic $ZrO_2$ and cubic ZrO. Further, the zirconium-containing oxide is more preferably both of the cubic $ZrO_2$ and the cubic ZrO. Accordingly, both wear resistance and breakage resistance can be attained in the sintered material.

Small amount(s) of one or more oxides selected from a group consisting of aluminum oxide, calcium oxide, magnesium oxide, and yttrium oxide may be dissolved in a solid state in the cubic $ZrO_2$. The cubic $ZrO_2$ may generally include so-called partially stabilized $ZrO_2$. Here, the term "partially stabilized $ZrO_2$" has the conventionally known meaning, and typically refers to $ZrO_2$ in which cubic and tetragonal crystals become stable or metastable at a room temperature by dissolving an oxide other than zirconia in a solid state to decrease oxygen vacancies in the structure to result in stabilization. In the present specification, "$ZrO_2$" in which a small amount of an oxide other than zirconia is dissolved in the solid state as described above is also referred to as "$ZrO_2$" unless otherwise stated particularly.

The cubic $ZrO_2$ preferably includes the above-described partially stabilized $ZrO_2$. Further, the cubic $ZrO_2$ more preferably consists of the partially stabilized $ZrO_2$. When the cubic $ZrO_2$ includes the partially stabilized $ZrO_2$, examples of this partially stabilized $ZrO_2$ includes partially stabilized $ZrO_2$ having $Al_2O_3$ and $Y_2O_3$ dissolved therein in the solid state as oxides other than zirconia.

The zirconium-containing oxide preferably has an average particle size of 0.01 to 0.1 μm. The content of the zirconium-containing oxide is preferably 0.1 to 10 volume % in the sintered material. The average particle size and content of the zirconium-containing oxide can be calculated in the same manners as those for calculating the average particle size and content of the cubic boron nitride.

<Zirconium-Containing Nitride>

The sintered material of the present embodiment includes the zirconium-containing nitride. The zirconium-containing nitride includes both or one of ZrN and ZrON. The zirconium-containing nitride preferably consists of both or one of ZrN and ZrON. The zirconium-containing nitride provides a binding effect between the cBN particles and the particles of the zirconium-containing oxide (both or one of the cubic $ZrO_2$ and the cubic ZrO), thereby effectively preventing the particles of the zirconium-containing oxide from falling from the sintered material at a worn portion of the sintered material during cutting. In the present specification, the term "ZrON" refers to ZrON in which O is partially dissolved in ZrN in the solid state. Further, the "ZrON" can also be regarded as a zirconium-containing oxide; however, for ease of description, the ZrON is assumed as a nitride in the present specification.

Here, the zirconium-containing nitride is generated in the sintered material by sintering mixed source material powder in a step of obtaining the sintered material as described below in the section <<Method of Producing Sintered Material>>. The mixed source material powder is obtained by mixing cBN, both or one of zirconia having alumina dissolved therein in the solid state (hereinafter, also referred to as "$Al_2O_3$-dissolved $ZrO_2$") and zirconia ($ZrO_2$), and alumina. In this case, the $Al_2O_3$-dissolved $ZrO_2$ and the zirconia ($ZrO_2$) in the mixed source material need to be produced using a below-described spray pyrolysis method or the like so as to control to attain a very small content of nitrogen. For example, by producing the $Al_2O_3$-dissolved $ZrO_2$ using the spray pyrolysis method or the like, the $Al_2O_3$-dissolved $ZrO_2$ is controlled to have a nitrogen content of 0.003 to 0.5 mass %. A method of measuring a nitrogen content in each of the $Al_2O_3$-dissolved $ZrO_2$ and the zirconia ($ZrO_2$) will be described later.

The zirconium-containing nitride preferably has an average particle size of 0.01 to 1 μm. The content of the zirconium-containing nitride is preferably 0.1 to 10 volume % in the sintered material. The average particle size and content of the zirconium-containing nitride can be calculated in the same manners as those for calculating the average particle size and content of the cubic boron nitride.

<Aluminum-Containing Oxide>

The sintered material of the present embodiment includes the aluminum-containing oxide. The aluminum-containing oxide includes the a type $Al_2O_3$ (aluminum oxide having an a type crystal structure). The aluminum-containing oxide is considered to contribute to high hardness and high strength of the sintered material. In addition to the α type $Al_2O_3$, the aluminum-containing oxide can include, for example, γ type $Al_2O_3$ (aluminum oxide having a γ type crystal structure) and κ type $Al_2O_3$ (aluminum oxide having a κ type crystal structure). The aluminum-containing oxide can also include only the a type $Al_2O_3$.

The aluminum-containing oxide preferably has an average particle size of 0.1 to 1 μm. The content of the aluminum-containing oxide is preferably 0.1 to 30 volume % in the sintered material. The average particle size and content of the aluminum-containing oxide can be calculated in the same manners as those for calculating the average particle size and content of the cubic boron nitride.

<X-Ray Diffraction Intensity>

In the present embodiment, the following feature is preferably provided in a graph (hereinafter, also referred to as "X-ray diffraction intensity profile") indicating 2θ in its horizontal axis and a relative intensity in its vertical axis as a result of measuring an X-ray diffraction intensity of the sintered material using an X-ray diffraction method. That is, a peak of the relative intensity in a (331) plane of the zirconium-containing nitride in the sintered material, specifically, a peak of the relative intensity in a (331) plane of each of both of the ZrN and the ZrON or a peak of the relative intensity in a (331) plane of one of the ZrN and the ZrON preferably appears in a range of more than or equal to 93.5° and less than or equal to 94.5°. In the above-described sintered material, the appearance of the peak of the relative intensity in the (331) plane of each of both of the ZrN and the ZrON or the peak of the relative intensity in the (331) plane of one of the ZrN and the ZrON in the range of 2θ of more than or equal to 93.5° and less than or equal to 94.5° means that the sintered material includes both or one of the ZrN and the ZrON. Accordingly, the sintered material is excellent in both wear resistance and breakage resistance to attain excellent flexural strength and life.

Since the X-ray diffraction intensity of the sintered material can be measured using an ordinary X-ray diffractometer, device or measurement conditions therefor should not be particularly limited. For example, the X-ray diffraction intensity of the sintered material can be measured using an X-ray diffractometer (trademark (model number): "MiniFlex600" provided by Rigaku; analysis software: "PDXL2"). Measurement conditions may be set, for example, as follows.

(Measurement Conditions for X-Ray Diffraction Intensity)

Characteristic X-ray: Cu-Kα
Tube voltage: 45 kV
Tube current: 200 mA
Filter: multilayer mirror
Optical system: concentration method
X-ray diffraction method: θ-2θ method
Scanning speed of X-ray diffractometer: 5°/minute; Step: 0.02°; Scanning range: 10 to 120°.

In the measurement, compounds included in the sintered material subjected to the measurement can be identified from the obtained X-ray diffraction intensity data by using an automatic analysis function of the above-described analysis software. Accordingly, it can be determined whether or not the ZrN and the ZrON are generated in the sintered material. When both or one of the ZrN and the ZrON are generated in the sintered material, the result of measurement of the X-ray diffraction intensity of the above-described sintered material is expressed in the graph indicating 2θ in its horizontal axis and the relative intensity in its vertical axis with an operation being performed to remove the background. In this case, the sintered material preferably satisfies a relational expression of $0.31 \leq I_{Zr}/I_{Al} \leq 0.62$, where $I_{Zr}$ represents the peak of the relative intensity in the (331) plane of each of both of the ZrN and the ZrON or the peak of the relative intensity in the (331) plane of one of the ZrN and the ZrON, and $I_{Al}$ represents the peak of the relative intensity in the (226) plane of the α type $Al_2O_3$.

Further, in the graph indicating 2θ in its horizontal axis and the relative intensity in its vertical axis as a result of measuring the X-ray diffraction intensity of the sintered material using the above-described X-ray diffraction method, the sintered material preferably satisfies a relational expression of $0.12 \leq I_{Zr}/I_{BN} \leq 0.48$, where $I_{Zr}$ represents the peak of the relative intensity in the (331) plane of each of both of the ZrN and the ZrON or the peak of the relative intensity in the (331) plane of one of the ZrN and the ZrON, and $I_{BN}$ represents the peak of the relative intensity in the (220) plane of the cubic boron nitride. In these cases, the sintered material can be more excellent with regard to flexural strength and life.

Here, the relational expression of "$0.31 \leq I_{Zr}/I_{Al} \leq 0.62$" indirectly indicates a content ratio of both or one of the ZrN and the ZrON and the α type $Al_2O_3$. When $I_{Zr}/I_{Al}$ is less than 0.31, it is indicated that the content of both or one of the ZrN and the ZrON in the sintered material is much smaller than the content of the α type $Al_2O_3$. In this case, the flexural strength and life tend to be decreased in the sintered material. When $I_{Zr}/I_{Al}$ is more than 0.62, it is indicated that the content of both or one of the ZrN and the ZrON in the sintered material is much larger than the content of the α type $Al_2O_3$. In this case, a reaction between the $ZrO_2$ and the cBN tends to be prevented when sintering the powder (mixed source materials described later) serving as the source materials, with the result that the sintered material may not be improved in performance with regard to flexural strength and life.

Further, the relational expression of "$0.12 \leq I_{Zr}/I_{BN} \leq 0.48$" indirectly indicates a content ratio of both or one of the ZrN and the ZrON and the cBN in the sintered material. When $I_{Zr}/I_{BN}$ is less than 0.12, it is indicated that the content of both or one of the ZrN and the ZrON in the sintered material is much smaller than the content of the cBN. In this case, the flexural strength and life tend to be decreased in the sintered material. When $I_{Zr}/I_{BN}$ is more than 0.48, it is indicated that the content of both or one of the ZrN and the ZrON in the sintered material is much larger than the content of the cBN. In this case, a reaction between the $ZrO_2$ and the cBN tends to be prevented when sintering the powder serving as the source materials, with the result that the sintered material may not be improved in performance with regard to the flexural strength and life.

That is, the two relational expressions described above indicates that the content of both or one of the ZrN and the ZrON in the sintered material is controlled to be an appropriate amount as compared with the content of the α type $Al_2O_3$ and the content of cBN in order to attain more excellent flexural strength and life in the sintered material of the present embodiment.

The two relational expressions described above are more preferably $0.41 \leq I_{Zr}/I_{Al} \leq 0.62$ and $0.17 \leq I_{Zr}/I_{BN} \leq 0.48$, respectively.

Here, the relative content ratio of both or one of the ZrN and the ZrON and the $Al_2O_3$ and the cBN in the sintered material is represented by way of the X-ray diffraction intensity ratio because it is difficult to specify the ZrN, the ZrON, the ZrO, and the $ZrO_2$ with the ZrN, the ZrON, the ZrO, and the $ZrO_2$ being apparently distinguished from one another in structure images such as secondary electron image and reflected electron image in the SEM.

<Other Oxide(s)>

The sintered material of the present embodiment can further include other oxide(s) in addition to the cubic boron nitride, the zirconium-containing oxide, the zirconium-containing nitride and the aluminum-containing oxide. Examples of the other oxide(s) preferably include at least one selected from a group consisting of magnesium oxide, cerium oxide, yttrium oxide, and hafnium oxide. The sintered material including the other oxide(s) has improved sinterability and more improved strength. The other oxide(s) illustratively described here may be included in the sintered material in the following cases: a case where an oxide originated from the source material of the zirconium-containing oxide is diffused in the below-described step of obtaining the sintered material and is accordingly included in the sintered material; and a case where an oxide added as one of the above-described source materials is directly included in the sintered material.

The other oxide(s) preferably have an average particle size of 0.05 to 5 μm. When the average particle size of the other oxide(s) is less than 0.05 μm, aggregation is likely to occur when mixed with the other source materials, with the result that sintering tends to be insufficient. When the average particle size of the other oxide(s) is more than 5 μm, the strength tends to be decreased due to grain growth during the sintering.

The other oxide(s) are preferably contained in the sintered material at a ratio of 5 to 50 volume %. When the ratio is less than 5 volume %, the strength of the sintered material tends not to be sufficiently improved. When the ratio is more than 50 volume %, the content of the high-hardness cBN is decreased, with the result that the hardness of the sintered material tends not to be sufficiently improved. A more preferable content ratio of the other oxide(s) is 10 to 30 volume %.

The average particle size and content of the other oxide(s) can be calculated in the same manners as those for calculating the average particle size and content of the cubic boron nitride.

<Auxiliary Binder>

The sintered material of the present embodiment can further include an auxiliary binder in addition to the cubic boron nitride, the zirconium-containing oxide, the zirconium-containing nitride, and the aluminum-containing oxide. The sintered material can include the auxiliary binder together with the above-described other oxide(s).

The auxiliary binder is preferably at least one compound composed of: at least one element selected from a group consisting of a group 4 element (such as Ti, Zr or Hf), a group 5 element (such as V, Nb or Ta) and a group 6 element (such as Cr, Mo or W) in the periodic table, Al, and Si; and at least one element selected from a group consisting of carbon, nitrogen and boron. The sintered material including the auxiliary binder has improved sinterability and more improved strength.

Specific examples of the compound of the auxiliary binder include TiC, TiN, $TiB_2$, TiCrN, ZrC, ZrN, $ZrB_2$, AlCrN, AlN, $AlB_2$, SiC, $Si_3N_4$, HfC, HfN, VC, VN, NbC, TaC, CrC, CrN, $Cr_2N$, MoC, WC, and the like. As the auxiliary binder, one of these compounds may be used solely or two or more of these compounds may be used in combination.

The auxiliary binder preferably has an average particle size of 0.05 to 5 m. When the average particle size of the auxiliary binder is less than 0.05 m, aggregation is likely to occur when mixed with the other source materials, with the result that sintering tends to be insufficient. When the average particle size of the auxiliary binder is more than 5 m, the strength of the sintered material tends to be decreased.

The auxiliary binder is preferably contained in the sintered material at a ratio of 5 to 50 volume %. When the ratio is less than 5 volume %, the strength of the sintered material may not be sufficiently improved. When the ratio is more than 50 volume %, the content of the high-hardness cBN is decreased, with the result that the strength of the sintered material tends not to be sufficiently improved. A more preferable content ratio of the auxiliary binder is 10 to 30 volume %.

The average particle size and content of the auxiliary binder can be calculated in the same manners as those for calculating the average particle size and content of the cubic boron nitride.

<Sintering Aid>

The sintered material of the present embodiment can further include a sintering aid that may be used in the below-described step of obtaining the sintered material, in addition to the cubic boron nitride, the zirconium-containing oxide, the zirconium-containing nitride, and the aluminum-containing oxide.

Specific examples of the sintering aid includes one or more selected from a group consisting of $MgO_2$, $HfO_2$, $ReO_2$, $Y_2O_3$, $WO_3$, $TiO_2$, $V_2O_5$, $VO_2$, $V_2O_3$, $SiO_2$ and other metal oxides, Al, Co, Ti and other metals, TiC, TiN, $TiB_2$, TiCrN, ZrC, ZrN, $ZrB_2$, AlCrN, AlN, $AlB_2$, SiC, $Si_3N_4$, HfC, HfN, VC, VN, NbC, TaC, CrC, CrN, $Cr_2N$, MoC, and WC. When the same compound is used for the auxiliary binder and the sintering aid, a required amount of the compound as one of the auxiliary binder and the sintering aid may be added, rather than a total of respective required amounts of the compound as the auxiliary binder and the sintering aid.

The sintering aid is preferably contained in the sintered material at a ratio of 0 to 30 volume %. When the ratio is more than 30 volume %, the respective contents of the cubic boron nitride, the zirconium-containing oxide, the zirconium-containing nitride, and the aluminum-containing oxide in the sintered material are decreased, with the result that a desired effect tends not to be obtained sufficiently in the sintered material. A more preferable content ratio of the sintering aid is 0 to 15 volume %. The content of the sintering aid can be calculated in the same manner as that for calculating the content of the cubic boron nitride.

<<Cutting Tool>>

A cutting tool of the present embodiment includes the above-described sintered material. Such a cutting tool can have excellent flexural strength and life. The cutting tool is preferably entirely composed of the above-described sintered material. Also, only a portion (for example, a cutting edge portion) of the cutting tool is preferably composed of the above-described sintered material. A coating film may be formed on a surface of the cutting tool.

Examples of applications of the cutting tool include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

Further, the sintered material of the present embodiment can be also applied to a friction-stir welding tool and the like in addition to the cutting tool.

<<Method of Producing Sintered Material>>

The sintered material of the present embodiment can be produced by employing a conventionally known production method except that the $Al_2O_3$-dissolved $ZrO_2$ and zirconia ($ZrO_2$), each of which serves as a source material of the zirconium-containing oxide, are prepared as described below. That is, the method of producing the sintered material preferably includes: the step of mixing the source materials using a bead mill, a ball mill, or the like, the source materials including the cubic boron nitride, both or one of the $Al_2O_3$-dissolved $ZrO_2$ and the $ZrO_2$ prepared as described below, alumina, and the other components (the other oxide(s), the auxiliary binder, the sintering aid, and the like) added as required; and the step of obtaining the sintered material by sintering the mixed source materials under predetermined conditions.

<Step of Mixing Source Materials>

In the step of mixing the source materials, the cubic boron nitride, both or one of the $Al_2O_3$-dissolved $ZrO_2$ and the $ZrO_2$ prepared as described below, alumina, and the above-described other components are prepared, and these source materials are mixed using a bead mill, a ball mill, or the like. The cubic boron nitride and alumina among these source materials can be prepared by using conventionally known cubic boron nitride and alumina as long as the above-described sintered material including the cubic boron nitride and the aluminum-containing oxide are produced.

Here, the cubic boron nitride used as a source material is different from the cubic boron nitride in the sintered material in that thermal hysteresis is applied during sintering. The $ZrO_2$ used as a source material is $ZrO_2$ having any crystal form, and will exist as cubic $ZrO_2$, cubic ZrO, ZrN, or ZrON in the sintered material after sintering. In the sintered material, the $Al_2O_3$-dissolved $ZrO_2$ exists as cubic $ZrO_2$ (specifically, for example, alumina-toughened zirconia (ATZ)). The alumina used as a source material preferably includes α type $Al_2O_3$, and is different from the aluminum-containing oxide in the sintered material in that thermal hysteresis is applied during sintering.

(Preparation of $Al_2O_3$-Dissolved $ZrO_2$)

The $Al_2O_3$-dissolved $ZrO_2$ can be prepared through the following steps: a step (step A) of obtaining an amorphous hydrated zirconia solid solution using the spray pyrolysis method; and a step (step B) of calcining this amorphous hydrated zirconia solid solution. Accordingly, the $Al_2O_3$-dissolved $ZrO_2$ to be used in the step of mixing the source materials can be prepared. The $Al_2O_3$-dissolved $ZrO_2$ refers to a crystalline partially stabilized zirconia in which $Al_2O_3$ is dissolved in the solid state as a solid solution. Through the sintering step, the $Al_2O_3$-dissolved $ZrO_2$ is changed into cubic $ZrO_2$ (for example, alumina-toughened zirconia (ATZ)). The $Al_2O_3$-dissolved $ZrO_2$ is preferably pulverized into powder after step B and used in the step of mixing the source materials.

(Step A)

In step A, first, a zirconium salt hydrate, an aluminum salt, and an yttrium salt are added into water such that an atomic ratio of aluminum (Al), zirconium (Zr) and yttrium (Y) becomes 0 to 70:0 to 100:0 to 5 (in atom %). Then, they are mixed, thereby preparing a mixed water solution. Here, in the present specification, in addition to aluminum (Al), yttrium (Y) is illustratively described as a metal dissolved in the solid state in the zirconia ($ZrO_2$); however, the metal dissolved in the $ZrO_2$ in the solid state in addition to Al is not limited thereto. Further, in step A, the above-described salts can be added to ethanol, acetone, or the like apart from the water.

Examples of the zirconium salt hydrate include zirconium oxychloride ($ZrOCl_2.8H_2O$), zirconium oxynitrate ($ZrO(NO_3)_2.2H_2O$), zirconium acetate ($ZrO(CH_3COO)_2$), and the like. Examples of the aluminum salt include aluminum chloride ($AlCl_3$), aluminum nitrate ($Al(NO_3)_3.2H_2O$), aluminum acetate ($Al_2O(CH_3COO)$), and the like. Examples of the yttrium salt include yttrium chloride ($YCl_3$), yttrium nitrate ($Y(NO_3)_3$), yttrium acetate ($Y(CH_3COO)_3$), and the like.

Next, the above-described mixed water solution is sprayed and is thermally decomposed under the following conditions using a spray pyrolysis device (for example, trademark (model number): "ACP-U16-H5" provided by ON General Electric Company), thereby obtaining the amorphous hydrated zirconia solid solution. That is, the amorphous hydrated zirconia solid solution can be obtained by performing spray pyrolysis onto the above-described mixed water solution under such conditions that a spray pyrolysis temperature is set to 600 to 1400° C., argon or atmospheric air is used as carrier gas, and a flow rate of the carrier gas is set to 1 to 10 L/min.

(Step B)

In step B, the amorphous hydrated zirconia solid solution obtained in step A is calcined. Accordingly, the $Al_2O_3$-dissolved $ZrO_2$ can be obtained. The calcination can be performed under such conditions that the temperature is set to 600 to 1400° C. in the atmospheric air and a holding time is set to 2 to 20 hours.

For example, when the amorphous hydrated zirconia solid solution obtained using, as a source material, the mixed water solution including the zirconium salt hydrate, the aluminum salt, and the yttrium salt is calcined, a crystalline partially stabilized zirconia ($ZrO_2$) having alumina ($Al_2O_3$) and yttria ($Y_2O_3$) dissolved therein in the solid state can be obtained as the $Al_2O_3$-dissolved $ZrO_2$. The $Al_2O_3$-dissolved $ZrO_2$ thus obtained has a nitrogen content of 0.003 to 0.5 mass %.

(Preparation of $ZrO_2$)

The $ZrO_2$ can be produced through the following steps: a step (step C) of obtaining amorphous zirconia using the spray pyrolysis method; and a step (step D) of calcining this amorphous zirconia. Accordingly, the $ZrO_2$ to be used in the step of mixing the source materials can be prepared.

Step C can be performed in the same manner as step A except that the source material used in step C is different from that in step A. That is, step C can be performed under the same spray pyrolysis conditions as those in step A except that a zirconia water solution is used. Likewise, step D can be performed in the same manner as step B except that the material to be calcined is different from that in step B. That is, step D can be performed under the same calcination conditions as those in step B except that the amorphous zirconia is used. The $ZrO_2$ thus obtained has a nitrogen content of 0.003 to 0.5 mass %.

$Al_2O_3$-dissolved $ZrO_2$ and $ZrO_2$ prepared by a method other than the spray pyrolysis method can be used as the source materials for the sintered material as long as each of such $Al_2O_3$-dissolved $ZrO_2$ and $ZrO_2$ has a nitrogen content of 0.003 to 0.5 mass %.

The nitrogen content in each of the $Al_2O_3$-dissolved $ZrO_2$ and the $ZrO_2$ can be measured using an inert gas fusion method. Nitrogen can be measured using the inert gas fusion method in a conventional manner. For example, $Al_2O_3$-dissolved $ZrO_2$ powder or $ZrO_2$ powder is placed into a crucible composed of carbon, and amounts of NO gas and $NO_2$ gas generated when heating the crucible are measured, thereby calculating a nitrogen content in the $Al_2O_3$-dissolved $ZrO_2$ or the $Zr_2$.

The nitrogen content in each of the $Al_2O_3$-dissolved $ZrO_2$ and the $ZrO_2$ is preferably 0.003 to 0.5 mass %. The nitrogen content in each of the $Al_2O_3$-dissolved $ZrO_2$ and the $ZrO_2$ is more preferably 0.01 to 0.2 mass %. When the nitrogen content in each of the $Al_2O_3$-dissolved $ZrO_2$ and the $ZrO_2$ is more than 0.5 mass %, the zirconium-containing oxide has a large number of oxygen vacancies to result in large strains in the sintered material obtained using them as the source materials.

Accordingly, the toughness tends to be decreased. When the nitrogen content in each of the $Al_2O_3$-dissolved $ZrO_2$ and the $ZrO_2$ is less than 0.003 mass %, the $Al_2O_3$ becomes coarse after sintering (ultra-high pressure sintering) in the sintered material obtained using them as the source materials. Accordingly, the toughness tends to be decreased.

<Step of Obtaining Sintered Material>

In the step of obtaining the sintered material, sintering is performed under predetermined conditions onto the mixed source materials including the cubic boron nitride, both or one of the $Al_2O_3$-dissolved $ZrO_2$ and the $ZrO_2$, the alumina, and the other components (the other oxide(s), the auxiliary binder, the sintering aid, and the like) added as required, thereby obtaining the sintered material. Specifically, the sintered material can be obtained by sintering the above-described mixed source materials under the following conditions: a pressure is set to less than or equal to 3 to 20 GPa; a temperature is set to 1000 to 1700° C.; and a holding time is set to 5 to 60 minutes.

Regarding the sintering conditions for obtaining the sintered material, the pressure is preferably 5 to 10 GPa, the temperature is preferably 1200 to 1400° C., and the holding time is preferably 15 to 45 minutes. The sintering method is not limited, and hot press, ultra-high pressure press, or the like can be used. Further, vacuum is preferable as the sintering atmosphere, but the sintering atmosphere should not be limited to this. A temperature increase rate in the sintering furnace is preferably set to 50 to 150° C./min.

The sintered material can be produced in this way. Such a sintered material can have excellent flexural strength and life.

EXAMPLES

While the present invention will be described in more detail hereinafter with reference to Examples, the present invention is not limited thereto.

Example 1

<Production of Sintered Material>

A sintered material was produced as follows.

(Step of Mixing Source Materials)

First, as the source materials, there were prepared: 60 volume % of cubic boron nitride (average particle size of 3 m; trademark "BN-T" provided by Showa Denko); 20 volume % of $Al_2O_3$-dissolved $ZrO_2$ (average particle size of 1.0 m); 16 volume % of a type $Al_2O_3$ (average particle size of 0.5 m; trademark "TM-DAR" provided by Taimei Chemicals); and 4 volume % of metallic Al (average particle size of 2.0 m) serving as a sintering aid.

Here, the $Al_2O_3$-dissolved $ZrO_2$ was prepared through steps A and B described above. That is, first, zirconium oxychloride ($ZrOCl_2.8H_2O$), aluminum chloride ($AlCl_3$), and yttrium chloride ($YCl_3$) were added to water, and then adjustment was made such that a molar ratio of $ZrO_2$ and $Y_2O_3$ became "$ZrO_2$:$Y_2O_3$=98.5:1.5" and a molar ratio of $ZrO_2$ having $Y_2O_3$ added therein and $Al_2O_3$ becomes "($ZrO_2$ having $Y_2O_3$ added therein): $Al_2O_3$=75:25". In this way, a mixed water solution was prepared.

Next, the mixed water solution was sprayed and was thermally decomposed under the following conditions using a spray pyrolysis device (trademark (model number): "ACP-U16-H5" provided by ON General Electric Company), thereby obtaining an amorphous hydrated zirconia solid solution (75 mol % (98.5 mol % $ZrO_2$-1.5 mol % $Y_2O_3$)-25 mol % $A_2O_3$). That is, the spray pyrolysis was performed under such conditions that: the spray pyrolysis temperature was set to 1000° C.; argon (having a purity of 5 N) was used as carrier gas (assuming that atmospheric air is included as impurity gas in the argon gas having the above-described purity, it was calculated that the argon gas had a nitrogen content of $8\times10^{-4}$ mass %); and a flow rate of the carrier gas was set to 4 L/min. In this way, an amorphous hydrated zirconia solid solution was obtained (step A).

Further, the amorphous hydrated zirconia solid solution was calcined under the atmospheric air at 900° C. for 1 hour, thereby obtaining a crystalline partially stabilized zirconia having alumina ($Al_2O_3$) and yttria ($Y_2O_3$) dissolved therein in the solid state as the $Al_2O_3$-dissolved $ZrO_2$ (step B).

Then, the above-described source materials (i.e., the cubic boron nitride, the $Al_2O_3$-dissolved $ZrO_2$, the a type $Al_2O_3$, and the sintering aid (metallic Al)) were mixed using a ball mill, thereby obtaining mixed source materials.

(Step of Obtaining Sintered Material)

A capsule composed of Nb was filled with the mixed source materials, was set in a container of an ultra-high pressure generation device, and was sintered at a sintering pressure of 5.5 GPa and a sintering temperature of 1400° C. for 15 minutes, thereby obtaining a sintered material. For the sintering atmosphere, a vacuum atmosphere was employed.

<Analysis on Sintered Material>

The X-ray diffraction intensity of the sintered material was measured under the above-described conditions using an X-ray diffractometer (trademark (model number): "Mini-Flex600" provided by Rigaku; analysis software: "PDXL2"). As a result, it was confirmed that the cubic boron nitride (cBN), the cubic $ZrO_2$ (ATZ), the cubic ZrO, the a type $Al_2O_3$, the ZrN, and the ZrON were generated. It was presumed that the ZrN and ZrON, which were not included in the source material powder, were generated together with the ZrO or the like due to a mutual reaction between the mixed source materials during the sintering in the ultra-high pressure generation device.

Here, the FIGURE shows a graph obtained by extracting a range of 2θ of 70° to 100° in an X-ray diffraction intensity profile of the sintered material of Example 1 as obtained from the measurement of the X-ray diffraction intensity. According to the FIGURE, the peak of the relative intensity (I) in the (331) plane of each of the ZrN and the ZrON appears in the range of 2θ of more than or equal to 93.5° and less than or equal to 94.5°. Thus, it is understood that the sintered material includes both or one of the ZrN and the ZrON. The unit of 2θ is "degree (°)", and the unit of the relative intensity (I) is "counts".

Further, Table 1 shows values of $I_{Zr}/I_{Al}$ and $I_{Zr}/I_{BN}$, where $I_{Zr}$ represents the peak of the relative intensity in the (331) plane of each of both of the ZrN and the ZrON or the peak of the relative intensity in the (331) plane of one of the ZrN and the ZrON, $I_{Al}$ represents the peak of the relative intensity in the (226) plane of the a type $Al_2O_3$, and $I_{BN}$ represents the peak of the relative intensity in the (220) plane of the cubic boron nitride. In the sintered material of Example 1, $I_{Zr}/I_{Al}$ was 0.51 and $I_{Zr}/I_{BN}$ was 0.29.

Examples 2 to 8

<Production of Sintered Material>

In an Example 2, a sintered material was produced in the same manner as in Example 1 except that the content of the cBN was 55 volume % and the content of the $Al_2O_3$-dissolved $ZrO_2$ was 25 volume %.

In an Example 3, a sintered material was produced in the same manner as in Example 1 except that the sintering temperature was set to 1300° C. in the step of obtaining the sintered material.

In an Example 4, a sintered material was produced in the same manner as in Example 1 except that the sintering temperature was set to 1350° C. in the step of obtaining the sintered material.

In an Example 5, a sintered material was produced in the same manner as in Example 1 except that the content of the cBN was 45 volume % and the content of the $Al_2O_3$-dissolved $ZrO_2$ was 35 volume %.

In an Example 6, a sintered material was produced in the same manner as in Example 1 except that the content of the cBN was 30 volume % and the content of the $Al_2O_3$-dissolved $ZrO_2$ was 50 volume %.

In an Example 7, a sintered material was produced in the same manner as in Example 1 except that the sintering temperature was set to 1500° C. in the step of obtaining the sintered material.

In an Example 8, a sintered material was produced in the same manner as in Example 1 except that the content of the cBN was 65 volume % and the content of the $Al_2O_3$-dissolved $ZrO_2$ was 15 volume %.

<Analysis on Sintered Materials>

The X-ray diffraction intensities of the sintered materials of Examples 2 to 8 were measured in the same manner as in Example 1. As a result, the peak of the relative intensity in the (331) plane of each of both of the ZrN and the ZrON or the peak of the relative intensity in the (331) plane of one of the ZrN and the ZrON appears in the range of 2θ of more than or equal to 93.5° and less than or equal to 94.5° in each of the sintered materials of Examples 2 to 8. Further, Table 1 shows values of $I_{Zr}/I_{Al}$ and $I_{Zr}/I_{BN}$ in each of the sintered materials of Examples 2 to 8. According to Table 1, $I_{Zr}/I_{Al}$ fell within the range of 0.21 to 0.85 and $I_{Zr}/I_{BN}$ fell within the range of 0.1 to 0.75 in each of the sintered materials of Examples 2 to 8.

Comparative Examples 1 and 2

<Production of Sintered Material>

In a Comparative Example 1, a sintered material was produced in the same manner as in Example 1 except that the sintering temperature was set to 1000° C. in the step of obtaining the sintered material. In a Comparative Example 2, a commercially available sintered material (trademark: "BX910" provided by Tungaloy Corporation) was obtained as a type of CBN material for processing a cast iron produced by centrifugal casting.

<Analysis on Sintered Materials>

The X-ray diffraction intensities of the sintered materials of Comparative Examples 1 and 2 were measured in the same manner as in Example 1. As a result, a reaction between the cBN and the $ZrO_2$ did not progress in the sintered material of Comparative Example 1 because the sintering temperature was low to be 1000° C., and no zirconium-containing nitride (ZrN and ZrON) was detected. Accordingly, it was considered that performance was not improved with regard to flexural strength and life. Although a method of producing the sintered material of Comparative Example 2 is unknown, no zirconium-containing nitride (ZrN and ZrON) was detected in the sintered material of Comparative Example 2. Accordingly, it was considered that performance was not improved with regard to flexural strength and life.

<<Flexural Strength Test>>

A flexural strength test was performed using each of the sintered materials of Examples 1 to 8 and Comparative Example 1 in the following manner. Results thereof are shown in Table 1. In Table 1, it is indicated that as the value of the flexural strength is higher, the sintered material is more excellent in flexural strength.

(Manner of Flexural Strength Test)

The flexural strength was measured in the following manner. That is, by processing the sintered materials obtained through ultra-high pressure sintering so as to provide each of the sintered materials with parallel surfaces, sintered materials for flexural strength measurement in Examples 1 to 8 and Comparative Example 1 were produced. By cutting and processing each of the sintered materials for the flexural strength measurement, ten samples each having a shape with a thickness of about 0.5 mm and a width of 3 mm were prepared for each of the Examples and Comparative Examples. Three-point flexural strength was measured using the ten samples. The value of the three-point flexural strength is the average value of those of the ten samples. When measuring the three-point flexural strength, an inter-fulcrum distance was set to 4 mm and a crosshead speed was set to 0.5 mm/minute. Since the sintered material of Comparative Example 2 was not a sintered material for flexural strength measurement, no flexural strength test was performed thereto.

<<Cutting Test>>

The sintered materials of Examples 1 to 8 and Comparative Examples 1 and 2 were used to produce cutting tools each having a shape of TCGW110208 with a negative land angle of 15° and a negative land width of 0.12 mm. For each of these cutting tools, an evaluation was made on cutting with the use of a machining center under the following cutting conditions.

(Cutting Conditions)

Cutting speed: 700 m/min.
Feeding speed: 0.3 mm/rev.
Depth of cut: 0.2 mm
Coolant: Wet type (20-times diluted emulsion).

(Machining Center)

NV5000 α1A/40 (provided by DMG MORI).

(Workpiece)

Composition: Difficult-to-cut cast iron (FC250; hardness HB200)

Shape: Cylindrical shape (outer diameter ϕ of 80 mm; inner diameter ϕ of 70 mm).

(Test Conditions)

The maximum wear width (m) of the flank face was measured per 0.2-km cutting, and a cutting distance (km) when the maximum wear width became more than or equal to 200 m was measured as a life. Results thereof are shown in Table 1. It is indicated that as the cutting distance is longer, the life of the cutting tool is longer.

TABLE 1

| | XRD Intensity Ratio of Sintered Material | | Flexural Strength | Cutting Test Life |
|---|---|---|---|---|
| | $I_{Zr}/I_{Al}$ | $I_{Zr}/I_{BN}$ | kgf/mm² | (km) |
| Example 1 | 0.51 | 0.29 | 158 | 2.5 |
| Example 2 | 0.41 | 0.48 | 164 | 3.4 |
| Example 3 | 0.50 | 0.23 | 165 | 3.1 |
| Example 4 | 0.62 | 0.32 | 170 | 2.6 |
| Example 5 | 0.25 | 0.12 | 132 | 2.7 |
| Example 6 | 0.21 | 0.17 | 121 | 2.9 |
| Example 7 | 0.85 | 0.75 | 118 | 2.1 |
| Example 8 | 0.47 | 0.1 | 112 | 1.8 |
| Comparative Example 1 | 0 (Not Detected) | 0 (Not Detected) | 56 | 0.5 |
| Comparative Example 2 | 0 (Not Detected) | 0 (Not Detected) | Not Measured | 0.7 |

As apparent from Table 1, it was confirmed that the sintered materials of Examples 1 to 8 are more excellent in flexural strength and life than the sintered materials of Comparative Examples 1 and 2. Thus, it is understood that each of the sintered materials of the Examples can have excellent flexural strength and life.

Heretofore, the embodiments and examples of the present disclosure have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

The invention claimed is:

1. A sintered material comprising a cubic boron nitride, alumina-toughened zirconia (ATZ), a zirconium-containing nitride, and an aluminum-containing oxide, wherein
   the zirconium-containing nitride includes at least ZrON,
   the aluminum-containing oxide includes a type $Al_2O_3$,
   in a graph indicating 2θ in a horizontal axis and a relative intensity in a vertical axis as a result of measuring an X-ray diffraction intensity of the sintered material using an X-ray diffraction method,
   the sintered material satisfies a relational expression of $0.31 \leq I_{Zr}/I_{Al} < 0.62$, where $I_{Zr}$ represents a peak of the relative intensity in a (331) plane of the ZrON, and $I_{Al}$ represents a peak of the relative intensity in a (226) plane of the α type $Al_2O_3$, and
   a content of the cubic boron nitride is 20 to 80 volume % in the sintered material.

2. The sintered material according to claim 1, wherein
   in a graph indicating 2θ in a horizontal axis and a relative intensity in a vertical axis as a result of measuring an X-ray diffraction intensity of the sintered material using an X-ray diffraction method,
   a peak of the relative intensity in a (331) plane of the ZrON appears in a range of more than or equal to 93.5° and less than or equal to 94.5°.

3. The sintered material according to claim 1, wherein
   in a graph indicating 2θ in a horizontal axis and a relative intensity in a vertical axis as a result of measuring an X-ray diffraction intensity of the sintered material using an X-ray diffraction method,
   the sintered material satisfies a relational expression of $0.12 \leq I_{Zr}/I_{BN} \leq 0.48$, where $I_{Zr}$ represents a peak of the relative intensity in a (331) plane of the ZrON, and $I_{BN}$ represents a peak of the relative intensity in a (220) plane of the cubic boron nitride.

4. A cutting tool comprising the sintered material recited in claim 1.

* * * * *